March 26, 1968   F. PAGANO   3,375,429
PHASE CONVERTING POWER TRANSFORMERS
Filed Nov. 1, 1966
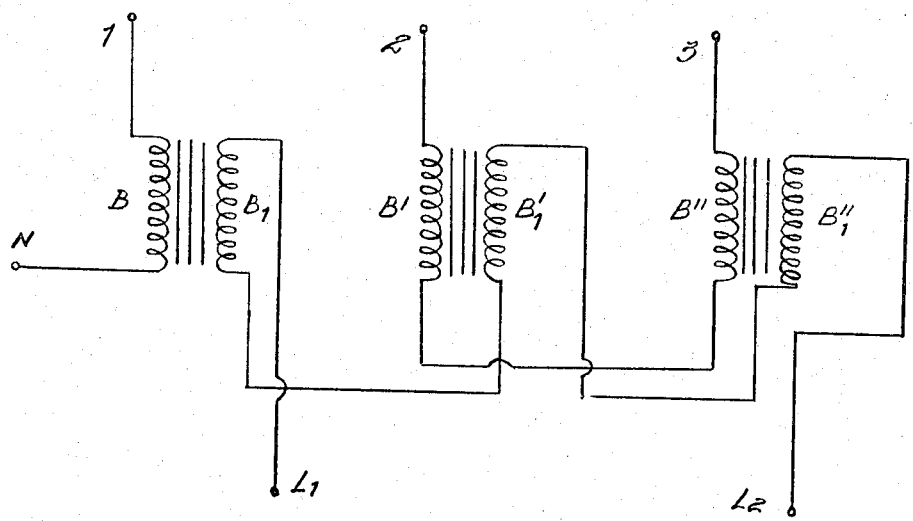
INVENTOR.
FERNANDO PAGANO
BY United States Patent Office 3,375,429
Patented Mar. 26, 1968

3,375,429
PHASE CONVERTING POWER TRANSFORMERS
Fernando Pagano, 2210 M.T. de Alvear,
Ciudadela, Buenos Aires, Argentina
Continuation-in-part of application Ser. No. 303,479,
Aug. 21, 1963. This application Nov. 1, 1966, Ser.
No. 591,312
5 Claims. (Cl. 321—57)

ABSTRACT OF THE DISCLOSURE

A phase converting power transformer for connecting a single phase load to a three-phase four conductor power supply, comprising a simple primary winding to be connected between one phase of the three-phase power supply and the neutral conductor of said power supply; a compound primary winding to be connected to the two remaining phases of said power supply; a secondary winding to be connected to said single phase load, said secondary winding comprising two windings, a first one corresponding to the secondary winding of said simple primary winding and the second one corresponding to the secondary winding of said compound primary winding.

---

The present invention refers in general terms to a power transformer and more particularly to a phase converting power transformer for connecting a single phase load to a three phase four conductor power supply and corresponds to a continuation in part application of my copending application Ser. No. 303,479, now abandoned.

A problem which has always existed in many industrial plants, is the connection of a single phase load to a three phase power supply without having to substantially unbalance the phases. It will be obvious to those skilled in the art that a single phase load could be connected between one phase conductor and the neutral conductor of a three phase supply although such a connection unbalances the phases and accordingly is most undesirable. This undesirability is even more pronounced if low impedance loads are used, as in such a case, the lack of uniform distribution of currents in each one of the phases is even more notorious.

There have been in the past several attempts to solve the problem of how to connect a single phase load to a three phase power supply. One known solution is to use a transformer having a Δ connected primary, each vertex of which is connected to one of the phases and a compound series wound secondary, comprising three windings of different numbers of turns. This known device furthermore requires a capacitance connected in parallel with one of the primary windings and an inductance in parallel with another, in order to obtain balanced power factor and balanced volt-ampere operation of the separate phases.

Another known device employs two Scott transformers (T connection), whose secondary windings are connected in series with a complex impedance and each in parallel with two further impedances which must fulfill certain relations in order that the three phases be in a balanced condition when in operation.

As is no doubt apparent from the foregoing, both known connections require the use of additional circuit elements which introduce certain drawbacks such as substantial initial expense; considerable space requirements, especially if the load is a large one; and lack of uniformity of values. Accordingly, each transformer must be practically "custom made" and what is more they introduce deformations into the shape of the waves due precisely to the nonlinear circuit elements coupled thereto.

There is still one more solution, which resides in connecting the single phase load to the three phase supply by means of a dynamic converter; this possibility will not be dealt with as they present invention relates exclusively to static devices.

Bearing in mind the foregoing drawbacks, it is the main object of the present invention to provide a static device, to be used in connecting a one phase load to a three phase power supply which does not require the use of additional circuit components.

A further object of the present invention is to provide a phase converting transformer, whereby, in operation, the currents circulating in each one of the phases of a three phase power supply are substantially equal, when the secondary winding of the converting transformer is connected to a single phase load.

With these and other objects in view, as will become apparent from the following description, reference will now be made, for a better understanding of the invention, to the drawing, in which is illustrated the circuit diagram of the phase converting power transformer of the present invention.

Before dealing with the specific connection of the transformer of the present invention, it should be noted that in the present specification and in the annexed claims, the word "balanced" is used to indicate equal currents in each one of the three conductors connecting the primary windings of the transformer of this invention to the power supply. In my opinion the circulation of a certain current in the neutral or fourth conductor of the three phase power supply, of a magnitude approximately equal to that of the magnitude of the current circulating in each one of the phases, is not a reason for believing that the system is unbalanced and that such condition should be avoided, as it is reasonably possible to connect the fourth or neutral conductor to ground avoiding that this conductor be overloaded due to its reduced section (in practice this conductor has a diameter approximately equal to one third the diameter of any one of the other three conductors of the three phase power supply). In the worst of events, an artificial neutral can be created by any of the known arrangements; obviously this last solution is more costly and therefore is preferably to be avoided. For a clearer understanding of the concept of the present invention a mechanical analogy, which I believe is pertinent, will now be indicated:

We do not wish to suggest that the system of this invention is not dynamically balanced, for it is believed to be dynamically balanced, and, therefore, does not violate any of the well-known and accepted terms used in the art. It is possible to use the invention in conventional systems without clashing with accepted standards.

If each phase of a three-phase power supply is represented by a rubber wheel, three wheels of equal radius positioned in such a way that their shafts correspond to the vertex of an isosceles triangle and with their peripheries in frictional engagement would correspond to a loaded three phase power supply. If one of these wheels is connected to a driving source, which for example, tends to rotate it in the clock-wise direction, one of the other wheels, due to its frictional relationship with the first wheel, will tend to rotate in the counterclockwise direction. This would be possible if there were no third wheel, inasmuch as this last wheel would have to rotate in counterclock-wise direction in order to follow the first wheel and in clock-wise direction in order to follow the second wheel. Therefore none of the three wheels rotate and the only way to achieve their rotation is by substantially increasing the power of the driving means whereby the frictional engagement is overcome and the power source drags the driven wheel against the braking effect of the other two.

If on the other hand this system is opened and a fourth wheel is added, in such a way that the axis of each one of these four wheels is positioned on the vertex of a square, that is, on the corner of a square, even if these wheels are in frictional engagement, by driving one of them the other three will be in the position to follow the impressed movement. This fourth wheel is equivalent to the neutral conductor of a three phase power supply.

Accordingly with the use of the fourth wheel higher efficiency is achieved as there is less power loss due to friction.

From the foregoing it will be implied that in a three conductor three phase system work is required to overcome the natural resistance created by the interaction of the three phases of the system while in the three phase four conductor arrangement all the work introduced in the system may be utilized and accordingly a higher efficiency is obtained.

Referring now to the figure, therein there is illustrated the circuit diagram of the phase converting power transformer of the present invention, which comprises a simple primary winding B adapted to be connected between one phase 1 and the neutral conductor N of a three-phase four conductor power supply; and a compound series-connected primary winding formed by two windings B′ and B″, adapted to be connected between the other two remaining phases 2 and 3 of the aforementioned power supply. The transformer of the present invention also comprises three secondary series connected windings $B_1$, and $B_1'$ and $B_1''$, a first one of which $B_1$ corresponds to the secondary winding of said simple primary winding B while the other two $B_1'$, and $B_1''$ define the secondary winding of said compound primary winding B′ and B″. The free terminals $L_1$ and $L_2$ of the secondary series connected windings are adapted to be connected to a load (not represented).

The aforementioned simple primary winding B and its corresponding secondary winding B, constitute a "simple transformer," while the compound primary windings B′ and B″ and their respective secondary windings $B_1'$ and $B_1''$, constitute a "compound transformer."

As will be seen from the drawing, the secondary windings are connected in opposite phase relationship. In other words, secondary windings $B_1'$ and $B_1''$ are connected so that the voltages induced therein are added while secondary winding $B_1$, is connected to the series connected secondary windings $B_1'$ and $B_1''$ in such a way that the voltage induced therein is subtracted from the total voltage induced in the just mentioned series connected secondary windings.

It will be evident to those skilled in the art that each corresponding primary and secondary windings are inductively coupled and wound round a magnetic core as is the case with all conventional transformers.

It is to be understood that although the invention has been so far described as applied to a transformer having three magnetic circuits, it is possible for it to have only two, as will become evident by combining both compound series connected primary windings B′ and B″ into only one, and parallelly combining both secondary windings $B_1'$ and $B_1''$.

In such a case the secondary winding comprises two windings ($B_1$; and $B_1'$ and $B_1''$ combined) connected in opposite phase relationship; a first one $B_1$ corresponding to the secondary windings of said simple primary winding B and the second one ($B_1'$ and $B_1''$ combined) corresponding to the secondary winding of said compound primary windings B′ and B″.

Accordingly it is to be understood that the words "simple" and "compound" have been taken merely for the benefit of clarity, as the compound windings may well be constituted by only one group of turns, the term "compound" for this case having been derived from the fact that such a winding is subjected to the combined effect of the voltages of two phases.

By means of substantial experimentation it has been found that in order to obtain substantially equal currents circulating in each one of the phases, the relationship between the turns ratio of the compound transformer and the turns ratio of the simple transformer should be 0.928; in other words the turns ratio of the compound transformer should be 0.928 times as great as the turns ratio of the simple transformer. Also by experimentation it has been found that the value 0.928 establishes the above mentioned conditions when the transformer is under load. With the secondary windings in open circuit, that is, under no load, the currents in the three-phases are equal when the turns ratio of the compound transformer is 0.866 times as great as the turns ratio of the simple transformer.

The expression "turns ratio" of a transformer is intended to define the relationship between the number of turns of the primary winding and the number of turns of the secondary winding of said transformer.

In most industrial applications of transformers certain tolerances are accepted with respect to output voltages; furthermore in three-phase systems certain tolerances are also accepted in connection with the values of currents in each one of the three-phases, before it being possible to consider that the system is unbalanced. Similarly to what has been pointed out above, the word "unbalanced" is used herein to signify that the values of the currents circulating in each one of the phases are different.

Accordingly, and in spite of the fact that the preferable turns relationship between the simple transformer and the compound transformer is 0.928 it will be apparent that in practice any relationship will be acceptable as long as therewith the values of the currents in each one of the phases are substantially equal within the limits acceptable to the tolerances specified for the particular use of the transformer. It has been found that the lower and upper limits for these relationships are approximately 0.66 and 1.33. Below or above these values, the currents circulating in each one of the phases are excessively dissimilar and therefore the use of the transformer of the present invention, under such conditions offers no real benefits. Therefore the turns ratio of said compound transformer may be between 0.66 and 1.33 times as great as the turns ratio of said simple transformer.

In order to corroborate the experimental results pointed out above, three of the many tests carried out will now be explained.

The transformer of the present invention was connected to a three-phase power supply and to a single phase load and by means of an ammeter of the type having jaws which are placed around the conductor in which the current is to be measured, the following measurements were taken:

The reading registered when the ammeter was placed around both conductors of the primary connection of the compound transformer was zero. The same reading was taken when the ammeter was placed around the two conductors connecting the primary winding of the simple transformer to one of the phases and to the neutral conductor. Furthermore, when the four conductors of the three phase system were surrounded by the ammeter, the reading was also zero; when the ammeter was placed around one conductor connecting the compound transformer to the three phase power supply and around the conductor connecting the primary of the simple transformer to the neutral conductor the reading was 2I; the reading taken on the other conductor connecting the compound transformer to the power supply and the conductor connecting the primary of the simple transformer to the neutral conductor was zero; the reading taken around this last conductor of the compound transformer, and the conductor connecting the simple transformer to one phase of the power supply was 2I, and the reading taken around the first mentioned conductor of the compound transformer and the conductor connecting one phase to the simple transformer was zero. From this it can be implied that, at a certain instant, the current in two phases circulates in one direction while in the other phase and the neutral conductor, it circulates in the opposite direction.

The second test carried out was to connect three watt-meters $M_1$, $M_2$ and $M_3$ into the loaded circuit of the transformer; one $M_1$ across the primary winding of the simple transformer; one $M_2$ across the primary winding of the compound transformer, and one $M_3$ across the secondary winding of the transformer. When the transformer was loaded by resistors, the reading on watt-meter $M_1$ was half of the reading taken on watt-meter $M_2$, while the reading taken on watt-meter $M_3$ was greater than the sum of the reading taken by watt-meters $M_1$ and $M_2$. The highest value of $M_3$ that was achieved, with equal currents circulating in each one of the phases and the neutral conductors, was $M_3 = 1.33(M_1 + M_2)$. If an inductive load is connected, the value of which is slowly increased, in place of the previous resistive load, the disc of meter $M_1$ looses speed, then stops and thereafter inverts its direction of rotation; simultaneously the disc of meter $M_3$ increases in speed. This test is to demonstrate the existence of an abnormal situation in the system which leads to an incorrect reading on the watt-meter and not to suggest that physically the value of the output is higher to that of the input. Furthermore, it is to be noted that the values of the readings taken on $M_1$, $M_2$, and $M_3$ must incorporate a positive or negative sign depending on the direction of rotation of the discs of the meters so that in absolute terms, $M_3$ can never be larger than $M_1$ plus $M_2$.

If a capacitive load is now connected across the secondary of the transformers, and this load is slowly increased, the disc of watt-meter $M_2$ slows down, stops, and then starts rotating in the opposite direction; while the speed of the disc of meter $M_1$ increases its speed.

The third test carried out was the following:

An inductive load was connected to a motor-generator system through a switch arrangement which made it possible that the load be connected either directly to the motor-generator system or else to the secondary winding of the transformer of the present invention. Obviously, in this last event the primary thereof was connected to the aforementioned motor-generator system. The speed regulator of the driving motor was fixed in such a position that the output of the generator corresponded to nominal frequency and nominal voltage when the load was connected thereto. Under these conditions the two-position switch was swung over, connecting in this way the load to the secondary winding of the transformer of the present invention; on doing this it was noted that the speed of the driving motor increased considerably thereby increasing the frequency and the voltage of the output. This increase was proportional to the reactive value of the load. For example, if the load was of a power factor equal to 0.5, in order to return the output of the generator to nominal frequency and voltage, without varying the position of the speed regulator, the load had to be increased approximately 2.3 times over its original value. If the same test is carried out with a resistive load, the speed of the generator increases but to a less extent than in the case of an inductive load.

The only satisfactory conceptual explanation which has been found, and which is believed to be correct, is based on the fact that the current induced in the secondary winding $B_1$ of the simple transformer induces in the primary windings $B'$ and $B''$ of the compound transformer a counter electromotive force, due to the series connection of the secondary windings $B_1$, $B_1'$, $B_1''$ of the simple transformer and the compound transformer. Similarly the current induced in the secondary windings $B_1'$ and $B_1''$ induces in the primary winding B a counter electromotive force, also due to the series connection of the secondary windings $B_1$, $B_1'$, $B_1''$. This counter-inducement of voltages and currents constitutes an effective interaction between the phases, which interaction is the basic motive of the surprising effects obtained by the transformer of the present invention.

In the foregoing description it has been stated that the secondary windings of the simple and compound transformers should be in opposite phase relationship; this is a preferable characteristic although it should be clearly established that the transformer of the present invention operates satisfactorily even if this requirement is not met.

It will be understood that improvements may be introduced into the embodiment described by way of example and modifications may be made in the construction and material employed without departing from the scope of the invention specifically defined in the following claims.

I claim:

1. A phase converting power transformer for connecting a single phase load to a three-phase four conductor power supply, comprising a simple primary winding adapted to be connected between one phase of the three-phase power supply and the neutral conductor of said three-phase four conductor power supply; a compound primary winding adapted to be connected to the two remaining phases of said three-phase four conductor power supply; a secondary winding adapted to be connected to said single phase load, said secondary winding comprising two windings connected in opposite phase relationship, a first one corresponding to the secondary winding of said simple primary winding and the second one corresponding to the secondary winding of said compound primary winding.

2. A phase converting power transformer for connecting a single phase load to a three-phase four conductor power supply, comprising a simple transformer constituted by a primary winding and a secondary winding, said primary winding being adapted to be connected between one phase conductor of the three-phase power supply and the neutral conductor thereof; and a compound transformer constituted by a compound primary winding and a secondary winding, said compound primary being adapted to be connected to the other two phase conductors of said three-phase four conductor power supply, said last mentioned secondary winding being connected in series with the secondary winding of said first transformer and in opposite phase relationship, said series connected secondary windings being adapted to be connected to said single phase load, the turns ratio of said compound transformer being 0.928 times as great as the turns ratio of said simple transformer.

3. A phase converting power transformer for connecting a single phase load to a three-phase four conductor power supply, comprising a simple transformer constituted by a primary winding and a secondary winding, said primary winding being adapted to be connected between one phase conductor of the three-phase power supply and the neutral conductor thereof; and a compound transformer constituted by a compound primary winding and a secondary winding, said compound primary being adapted to be connected to the other two phase conductors of said three-phase four conductor power supply, said last mentioned secondary winding being connected in series with the secondary winding of said first transformer and in opposite phase relationship, said series connected secondary windings being adapted to be connected to said single phase load; the turns ratio of said compound transformer being 0.866 times as great as the turns ratio of said simple transformer.

4. A phase converting power transformer for connecting a single phase load to a three-phase four conductor power supply, comprising a simple transformer constituted by a primary winding and a secondary winding, said primary winding being adapted to be connected between one phase conductor of the three-phase power supply and the neutral conductor thereof; and a compound transformer constituted by a compound primary winding and a secondary winding, said compound primary being adapted to be connected to the other two phase conductors of said three-phase four conductor power supply, said last mentioned secondary winding being connected in series with the secondary winding of said simple transformer and in opposite phase relationship, both said secondary windings being adapted to be connected to said single phase load; the turns ratio of said compound transformer being between 0.66 and 1.33 times as great as the turns ratio of said simple transformer.

5. A phase converting power transformer for connecting a single phase load to a three-phase four conductor power supply, comprising a simple transformer constituted by a primary winding and a secondary winding, said primary winding being adapted to be connected between one phase conductor of the three-phase power supply and the neutral conductor thereof; and a compound transformer constituted by a compound primary winding and a secondary winding, said compound primary being adapted to be connected to the other two phase conductors of said three-phase four conductor power supply, said last mentioned secondary winding being connected in series with the secondary winding of said first transformer, both said secondary windings being adapted to be connected to said single phase load; the turns ratio of said compound transformer being between 0.66 and 1.33 times as great as the turns ratio of said simple transformer.

References Cited

UNITED STATES PATENTS

| 2,074,276 | 3/1937 | Schmerber | 321—57 X |
| 2,359,768 | 10/1944 | Kiltie | 321—57 |

OTHER REFERENCES

Magnetic Circuits and Transformers, by E. E. Staff of M.I.T., pub. March 1961 by the Technology Press, pp. 568–572.

JOHN F. COUCH, *Primary Examiner.*

G. GOLDBERG, *Assistant Examiner.*